United States Patent [19]

Vail

[11] Patent Number: 4,471,721
[45] Date of Patent: Sep. 18, 1984

[54] TRAPDOOR FOR BIRDHOUSE

[75] Inventor: Arthur E. Vail, Griggsville, Ill.

[73] Assignee: Nature House, Inc., Griggsville, Ill.

[21] Appl. No.: 474,485

[22] Filed: Mar. 11, 1983

[51] Int. Cl.³ .................... A01K 31/00; A01M 23/20
[52] U.S. Cl. ........................................ 119/23; 43/61;
43/67; 119/49; 119/47
[58] Field of Search ................. 119/23, 47, 49, 45 R;
43/61, 67

[56] References Cited

U.S. PATENT DOCUMENTS

| | | | |
|---|---|---|---|
| 1,619,527 | 3/1927 | Moore | 119/49 |
| 2,229,685 | 1/1941 | Swedenburg | 43/61 |
| 3,125,823 | 3/1964 | Smith | 43/76 |
| 3,778,922 | 12/1973 | Clark | 43/61 |
| 4,173,092 | 11/1979 | Nakai | 43/61 |

OTHER PUBLICATIONS

Bird Banding with Small Equipment, Elizabeth Herrick, Jan. 20, 1923, p. 6, from U.S. Dept. of Agr.

Primary Examiner—Gene Mancene
Assistant Examiner—Kris R. Schulze
Attorney, Agent, or Firm—Silverman, Cass & Singer, Ltd.

[57] ABSTRACT

A trapdoor for a birdhouse, particularly one constructed to attract purple martin birds, so as to trap in a compartment of the house species of undesirable birds, such as sparrows. The door includes an opening to permit the undesirable birds to enter a compartment of the birdhouse. A pivotal gate is secured to the door behind the opening and is retained by a trigger mechanism in an unblocking position above the opening. When a bird enters the compartment through the opening and alights on the trigger mechanism, the gate is released and drops by gravity across the opening to trap the bird within the compartment. The trapdoor includes structure for positively locking the gate against inadvertent pivotal trapping movement should the birdhouse or trapdoor be moved or displaced.

5 Claims, 10 Drawing Figures

TRAPDOOR FOR BIRDHOUSE

BACKGROUND OF THE INVENTION

1. Field of the Invention

This invention relates generally to birdhouses, and more particularly, to a trapdoor with trigger mechanism for selectively trapping undesirable birds in such birdhouses.

2. Description of the Prior Art

Purple martin birds are a highly beneficial species because they are effective destroyers of garden insects and other pests, such as mosquitos. In order to attract such martins to a birdhouse, it is known that the same must be constructed to fairly precise specifications and be kept clean.

Martins will return to nest in the same birdhouse year after year, provided the birdhouse is clean and free of nests, twigs, debris, etc. of other birds upon return of the martins from their annual migration. Undesirable birds, such as sparrows, will occupy martin houses after the martins leave and therefore, it is necessary to regularly clean out the birdhouse to rid the same of the debris placed in the house by the undesirable birds so that the martins will return to nest in the house. Alternatively, traps can be used adjacent to martin houses to attract the undesirable birds and thereby discourage the same from nesting in the martin houses.

It is known to provide bated sparrow traps near the martin birdhouses to help alleviate the problem of sparrows nesting in the martin houses. For example, U.S. Pat. No. 3,778,922 discloses a sparrow trap of the type to be located near a martin birdhouse to capture undesirable sparrows for disposal. There are certain times of the year, however, when a baited trap is not effective since it is not selective in trapping only the undesirable bird species. Therefore, there is a need for a trap to selectively capture sparrows that are nesting or attempting to nest in a specific nesting compartment of a martin house.

It is known to provide a bird trap for use in a compartment of a martin birdhouse in which a trapdoor is substituted for a standard martin house door, except that the entrance hole provided in the door is of a smaller dimension than that which would permit martin birds to enter the compartment. Such prior art traps include a gate member positioned behind the entrance hole and retained in untripped position above the hole by a trigger mechanism which is tripped when a sparrow alights thereon upon entry into the birdhouse.

Problems have been encountered in use of the latter prior art bird traps, illustrated in FIG. 2, because it is difficult to maintain the gate member in untripped position until the bird to be trapped enters the birdhouse compartment. The gate is retained in tripped position by a trip arm engaged against the gate to force it against a compression spring, but the structure is unintentionally released easily by wind movement of the birdhouse or during the process of raising or lowering the same on a mounting post. Furthermore, it is difficult to reset the trigger mechanism of said prior art structure without opening the compartment which is inconvenient.

Traps for capturing animals by using various types of door trapping mechanisms are known in the art. In addition to U.S. Pat. No. 3,778,922 noted above, the following patents are illustrative of such devices:

| 1,625,027 | 2,813,639 |
| 2,567,664 | 3,729,852 |
| 2,573,228 | |

Although these patents describe various traps to capture sparrows and the like to preclude them from nest building activities in birdhouses designed for martins or other selected species, none of these patents is concerned with a trap specifically for use in a martin birdhouse to selectively trap sparrows that are nesting or attempting to nest in the house.

The device of the present invention provides an effective birdhouse trapdoor that can convert a standard birdhouse compartment into a trap for capturing only undesirable birds in that compartment. The invention provides an effective trigger mechanism for releasing the trapdoor which cannot be tripped inadvertently by movement of the house in raising or lowering the same on its mounting pole or by movement in the wind. Furthermore, the invention provides an effective expedient for resetting the trigger mechanism after initial use.

SUMMARY OF THE INVENTION

The invention is characterized by an elongate gate member pivotally mounted behind the opening through the door of a birdhouse which permits birds to enter a compartment thereof. The gate is retained above the opening in retracted condition by a trip arm which engages and supports the gate at a location spaced from the pivot point thereof. An extension of the trip arm positioned below the door opening provides a trigger mechanism to disengage the trip arm from the gate and permit the gate to drop across the door blocking exit from the compartment when a bird enters the compartment and steps on the trigger. Matingly engageable reverse angle surfaces are provided on the trip arm and the surface of the gate against which the arm rests in retracted condition to prevent inadvertent release of the gate prior to action by a bird stepping on the trigger mechanism. An extension of the trip arm through the face of the birdhouse door is provided to permit resetting of the trip mechanism from the outside of the birdhouse. A wing nut is attached to the gate and positioned on the outside of the house to permit the gate to be raised for resetting of the trip mechanism after initial use.

DESCRIPTION OF THE PREFERRED EMBODIMENT

Figure 1:
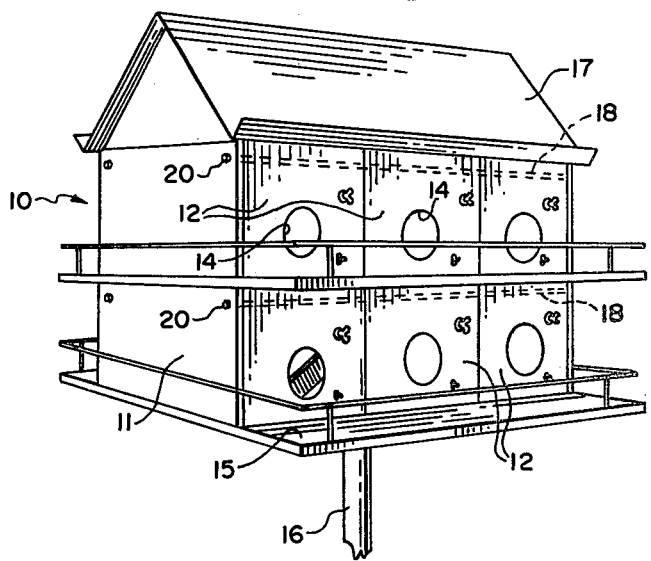
FIG. 1 is a perspective view of a birdhouse with several trapdoors constructed in accordance with the invention shown positioned thereon.

FIG. 1 illustrates a conventional sheet metal birdhouse 10, the design of which is capable of wide variation. The particular birdhouse shown has two tiers of compartments, each compartment having a front door illustrated in the drawings as the trapdoor 12 of the invention) with an opening 14 formed therein to permit a bird to enter the compartment to nest therein. The birdhouse 10 is positioned upon a mounting pole 16 and includes other known features, such as a bird landing platform 15 and roof 17. Although not shown, it is common to provide an elevator mechanism for moving the birdhouse 10 along the pole 16.

Each tier of the birdhouse 10 is provided with a support rod 18 passing through the house which is secured to opposite side walls 11 thereof by retainer nuts 20. The conventional front door (not shown) for each compartment of the birdhouse is intended to be removably installed upon the house by mounting same upon the support rod 18 and swinging or pivoting the door into a closed position in front of its respective compartment. The Figures illustrate trapdoors 12 which are positioned upon support rod 18 in the same manner as would be conventional doors for the house.

Each door 12 includes a front wall 22 and oppositely facing side walls 24, 26. Each side wall 24, 26 includes a respective mounting slot 28 which is adapted to be removably mounted upon support rod 18 and pivoted relative thereto to a generally vertical position as shown in FIG. 1 to form the front door of a respective compartment.

Figure 2:
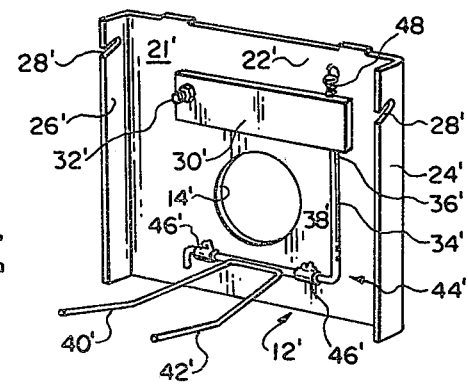
FIG. 2 is a rear perspective view showing the operating portions of a prior art trapdoor construction.
Figure 3:
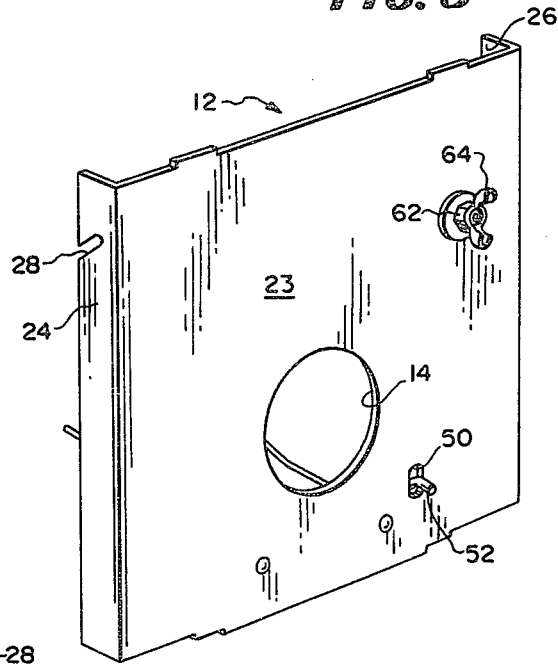
FIG. 3 is a front perspective view of a trapdoor constructed in accordance with the invention.

FIG. 2 illustrates a prior art trapdoor 12' which includes a conventional front wall 22' and side walls 24', 26', each having a respective mounting slot 28'. The prior art trapdoor is removably positionable upon birdhouse 10 in the manner described hereinabove by locating the same upon the support rod 18. Trapdoor 12' includes an opening 14' of a size which is smaller in dimension than that which would permit desirable martin birds to enter the compartment upon which trapdoor 12' is mounted. A generally rectangular elongate bar or gate 30' is pivotally mounted upon the inner facing surface 21' of front wall 22' by a pivot pin 32' such that gate 30' normally will rotate downwardly by the force of gravity about pivot pin 32'.

The prior art trapdoor 12' includes a trip arm 34' having a terminal end 36' and a right angle bent extension arm 38' formed as an extension of the trip arm 34'. A pair of lever arms 40', 42' are secured to the extension rod 38' and extend generally normal to the front wall 22' behind opening 14' to form a trigger mechanism, indicated generally as 44', for the trapdoor. The trigger mechanism 44' including lever arms 40', 42', extension arm 38' and trip arm 34' is secured to the trapdoor by brackets 46' which retain extension arm 38' to wall surface 21', but permit rotating movement of the extension arm 34'.

In the prior art structure of FIG. 2, gate 30' is set in retracted or unblocking condition relative to opening 14' by pivoting the same to the position shown in FIG. 2 in which the gate is elevated above opening 14'. Gate 30' is maintained in this latter, "set" position, by moving trip arm 34' so that the terminal end 36' thereof rests against the lower surface of gate 30' at a location spaced from pivot pin 32'. Spring member 48 is secured to wall surface 21' and engages the upper surface of gate 30' to press the gate against terminal end 36' of trip arm 34' to maintain the same in untripped position until a bird to be trapped enters the birdhouse compartment. Upon entry into the birdhouse compartment through opening 14', the bird will alight upon lever arms 40', 42', which actuate trigger mechanism 44' by pivoting trip arm 34' out of engagement with gate member 30'. The gate 30' thereupon pivots or falls by the force of gravity about pivot pin 32' to block opening 14' and trip the bird inside the compartment.

The difficulty encountered in operation of the prior art trapdoor shown in FIG. 2 is that gate member 30' may unintentionally be released easily by mere wind movement of the birdhouse or during the process of raising or lowering the same on the mounting pole 16. Furthermore, after gate 30' has been tripped and it is desired to reset the same into the position illustrated in FIG. 2, it is difficult to raise the gate member from the outside of the house and to reset the trigger mechanism without opening the compartment which is inconvenient.

The present invention, illustrated in detail in FIG. 3 through 10, comprises an improvement over the prior art trapdoor of FIG. 2. Trapdoor 12 of the invention includes the conventional front wall 22 with side walls 24, 26 and mounting slots 28 for removably positioning of the door upon the support rod 18 of house 12. Opening 14 is provided to permit a bird to be trapped to enter the compartment upon which trapdoor 12 has been installed. Trigger mechanism 44 includes trip arm 34 with extension arm 38 formed at right angle with respect thereto and upon which lever arms 40, 42 are secured. Extension arm 38 is secured to inner facing wall surface 21 of front wall 22 by brackets 46 which permit the extension arm 38 to rotate when a bird alights on lever arms 40, 42. Bar or gate 30 is secured to wall surface 21 by a pivot pin 32. Trapdoor 12 is formed with an opening 50 proximate the terminal end 52 of extension arm 38 which is bent at right angle with respect to arm 38 and passes through opening 50 to the outer facing front wall surface 23 of trapdoor 12.

Figure 4:
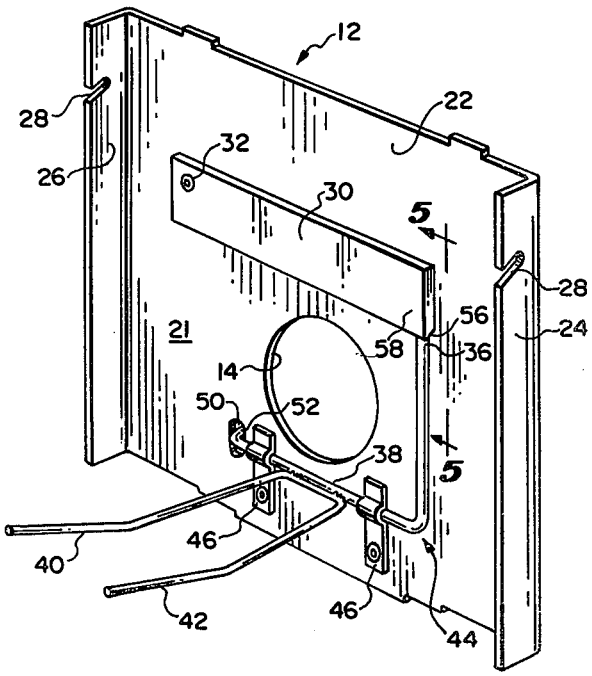
FIG. 4 is a perspective rear view of said trapdoor showing the gate and tripping mechanism thereof in retracted condition or not blocking the opening in the door.
Figure 5:
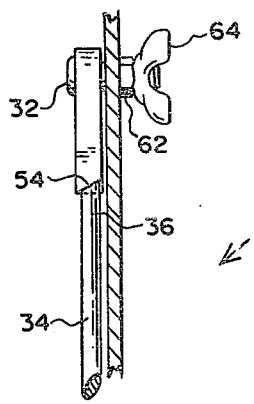
FIG. 5 is a fragmentary sectional view taken along the line 5—5 of FIG. 4 in the direction indicated generally.
Figure 6:
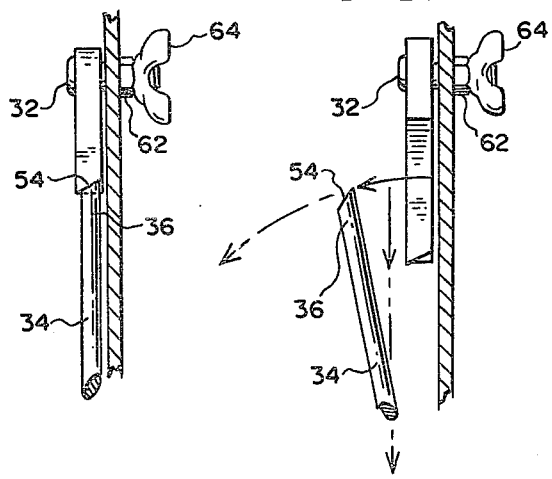
FIG. 6 is a view similar to that of FIG. 5 but showing the gate and trip arm in release position.
Figure 7:
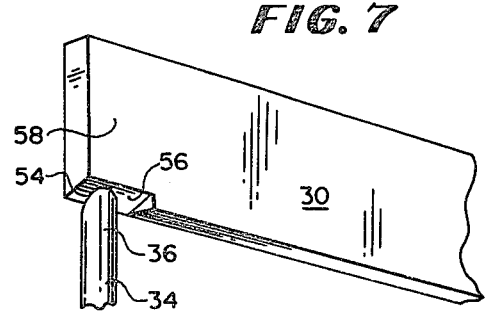
FIG. 7 is an enlarged fragmentary perspective view showing the gate and trip arm of the invention in engaged position.
Figure 8:
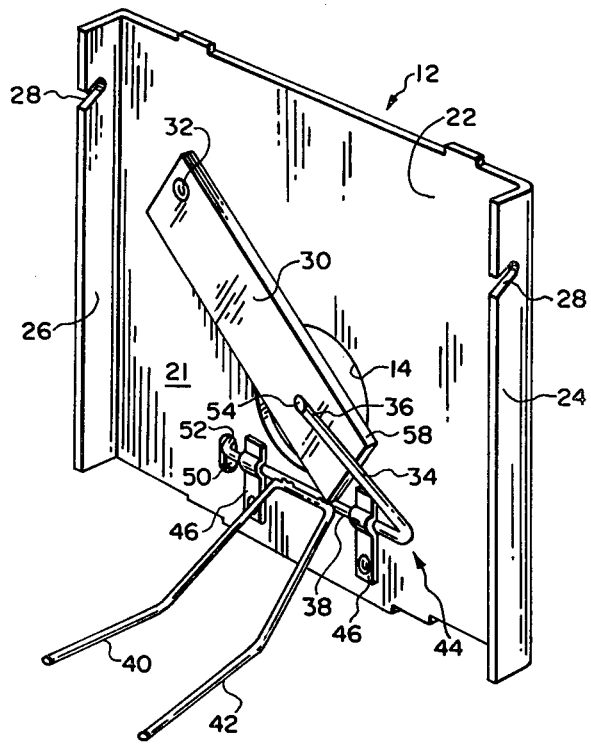
FIG. 8 is a rear perspective view similar to that of FIG. 4 showing the gate and trip arm in disengaged position.
Figure 9:
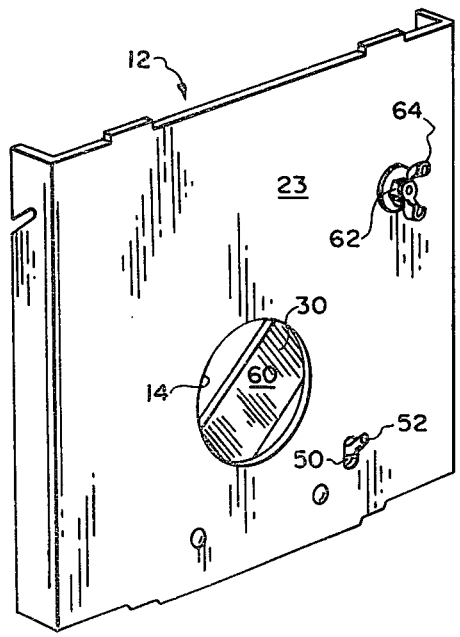
FIG. 9 is a front perspective view similar to that of FIG. 3 showing the gate in tripped position.

As seen most clearly in FIGS. 5, 6 and 7 the terminal end 36 of trip arm 34 of the invention is formed with a surface 54 which is of generally angular disposition relative to the elongate axis of trip arm 34. The lower surface 56 of terminal end 58 of gate member 30 is adapted for engagement with surface 54 of trip arm 34 when the gate is in "set" condition as shown in FIGS. 4, 5 and 7. For this reason, the lower surface 56 of gate 30 likewise is formed with an angular disposition that is complimentary to the angular surface 54 of trip arm 34. Thus, when the gate 30 is positioned in unblocking condition of opening 14 as seen in FIGS. 4, 5 and 7, the engaged, complimentary surfaces 54 and 56 of the trip arm and gate cooperate to prevent inadvertent or unintentional releasing of gate 30. The interaction of the trip arm 34 with gate 30 is such that wind movement or other jarring of the birdhouse will not actuate the trigger mechanism 44 but action of a positive force upon the trigger mechanism 44 such as when a bird alights on lever arms 40, 42 will so actuate. When a bird enters the birdhouse by passing through opening 14 and alights on lever arms 40, 42, the weight of the bird causes trip arm 34 to pivot. Pivoting of trip arm 34 causes the surface 54 of the trip arm to disengage from lower surface 56 of the gate 30 thereby releasing the same to fall by the force of gravity and block opening 14 as shown in FIGS. 8 and 9, thereby trapping the bird. As illustrated in FIG. 9, the outer facing surface 60 of gate 30 may be provided with a contrasting color, such as red, to alert the birdhouse owner that the trigger mechanism has been tripped and that a bird is trapped inside.

Figure 10:
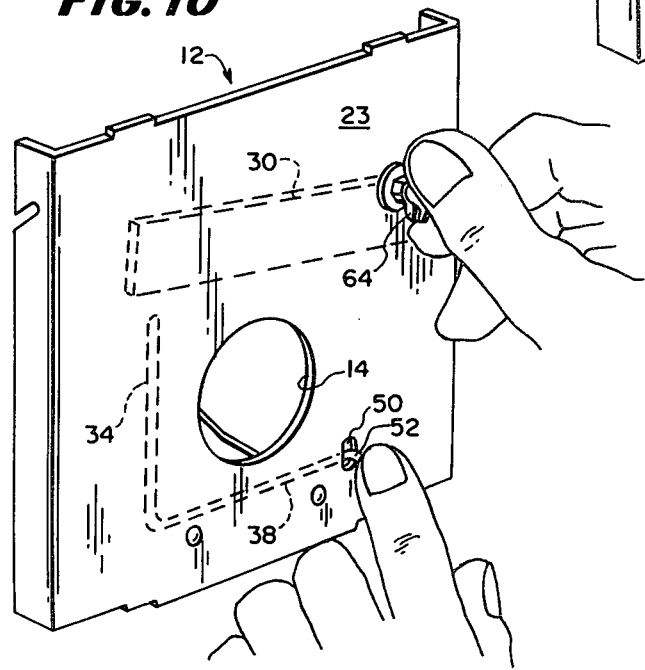
FIG. 10 is a front perspective view of the trapdoor of the invention illustrating the manner in which the gate is reset into untripped position.

After a bird has been trapped within the birdhouse compartment, it can be removed and the trap reset in the following manner. The pivot pin 32 is provided with an extension 62 which passes through the outer facing surface 23 of door 12 and has manually operable means, such as a wing nut 64 secured thereto. The pivot pin is secured to the gate such that the gate can be raised from the outside of the house by manually turning said means or wing nut 64 in a clockwise direction. As shown in FIG. 10, terminal end 52 of extension arm 38 which passes through opening 50 in outer facing surface 23 is operable as a lever by pushing down thereupon to rotate trip arm 34 back to its orientation at which surface 54 of trip arm 34 engages lower surface 56 of gate 30. The cooperating configuration of reverse angle surfaces 54 and 56 of trip arm 34 and gate 30 is such that use of spring 48 required in the prior art structure shown in FIG. 2 is not required to prevent the trigger mechanism 44 from accidentally tripping.

The assembly of gate 30 and trigger mechanism 44 is intentionally left slightly loose in order that when or if it is jarred, such as by wind movement of birdhouse 10, the terminal end 36 of trip arm 34 remains engaged with the gate 30. Furthermore, by reason of terminal end 52 of extension arm 38 and wing nut 64 of the gate 30 which are positioned on the outer facing surface 23 of trapdoor 12, resetting of the trap from outside of the birdhouse conveniently can be accomplished. The capability of raising or lowering gate 30 from the outside of the birdhouse also simplifies the process of removing a trapped bird after being caught.

Minor variations in the structure and other variations in the arrangement and size of the various parts may occur to those skilled in the art without departing from the spirit or circumventing the scope of the invention as set forth in the appended claims.

I claim:

1. In a birdhouse having a compartment for nesting a bird and the compartment has an open end wall, a trapdoor adapted to be mounted across said open end wall of the compartment comprising, a planar wall member having oppositely facing surfaces when so mounted relative to the compartment, an opening through said wall for passage of a bird therethrough into the compartment, an elongate gate member freely, pivotally mounted above and normally clear of the opening on the inwardly facing surface of the wall, a trigger mechanism in the compartment associated with said gate member to retain the same retracted above and clear of the opening, the trigger mechanism including a trip arm for engagement with the gate member at a location spaced from the pivot point thereof, and an extension of the trip arm positioned below the opening, and a lever arm secured to the extension extending beneath the opening and inwardly into the compartment whereby to move the extension and connected trip arm when a bird alights thereon, said trip arm and said gate member having matingly engageable reverse angle surfaces arranged at other than 180° from horizontal which cooperate when the trip arm is engaged with the gate member in said retracted condition to prevent inadvertent release of the gate member prior to a bird entering through the opening and alighting on the lever arm of the trigger mechanism for effecting positive disengagement of said surfaces thereby releasing the gate member to a position intercepting said opening.

2. A trapdoor as claimed in claim 1 in which the gate member is mounted to said wall by a pivot pin having an extension which terminates on the opposite facing surface of the wall, said pivot pin extension having means for manually moving the gate about its pivot point for returning the gate member to its normal position clear of said opening.

3. A trapdoor as claimed in claim 1 in which the extension of the trip arm has a terminal end, the front wall having a second opening positioned proximate the terminal end of the trip arm extension through which the extension passes to terminate on the outer facing surface of the wall, said terminal end of the trip arm extension being operable as a lever by exerting a downward force thereon to rotate the trip arm into its orientation to retain the gate member in retracted condition above the opening.

4. A trapdoor as described in claim 2 in which said manually operable means comprises an enlarged gripping formation.

5. A trapdoor as described in claim 1 having bearing means for pivotally mounting the same in said open end of the compartment.

* * * * *